Figure 1:
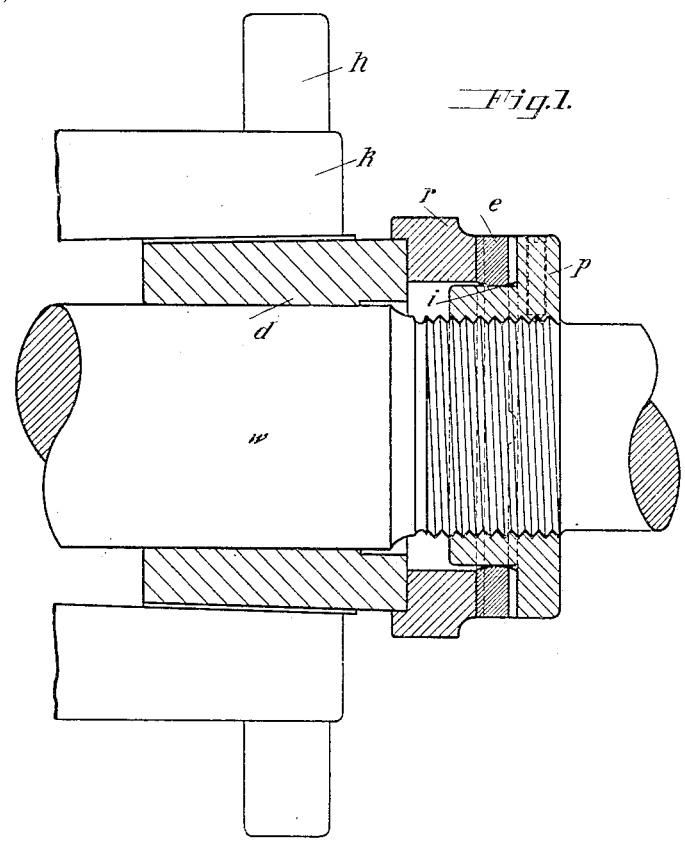

H. HAAGE.
COMMUTATOR.
APPLICATION FILED JULY 13, 1915.

1,205,197.

Patented Nov. 21, 1916.

Inventor:
Hugo Haage
By Knight Bros
his Attorney

UNITED STATES PATENT OFFICE.

HUGO HAAGE, OF BERNAU, NEAR BERLIN, GERMANY, ASSIGNOR TO SIEMENS-SCHUCKERT-WERKE G. M. B. H., OF BERLIN, GERMANY, A CORPORATION OF GERMANY.

COMMUTATOR.

1,205,197.      Specification of Letters Patent.      Patented Nov. 21, 1916.

Application filed July 13, 1915. Serial No. 39,722.

*To all whom it may concern:*

Be it known that I, HUGO HAAGE, a German citizen, and resident of Bernau, near Berlin, Germany, have invented certain new and useful Improvements in Commutators, of which the following is a specification.

The object of my present invention is to devise a commutator construction, especially for large continuous current dynamos, which avoids several disadvantages which have so far been met in connection with the pressure conditions and the heat expansion during service.

In ordinary commutator constructions the commutator is fastened upon the shaft of the armature by means of a pressure device which is pressed against the commutator segments or against a special sleeve provided underneath the commutator segments, this construction having the disadvantage that the shaft by reason of the uneven distribution of the pressure forces between the commutator sleeve and the pressure device will be subject to a bending strain and consequently be liable to come out of center. This may happen even if the pressure device and the pressure sleeve are carefully turned off at their contacting surfaces, so that said surfaces will be positioned in a plane which is exactly perpendicular to the axis of the shaft. If the commutator is heated up during service the shaft may be also bent by reason of the greater expansion, so that the segments themselves will be subject to bending forces.

According to my invention a ring-like intermediate member is inserted between the commutator sleeve and the pressure device which acts upon it in axial direction. This ring-like intermediate member serves to transmit the axially directed force of the pressure device to the commutator sleeve and at the same time serves to equalize and compensate for any unevenness or difference in the pressure forces which may develop. This is attained by a construction which, instead of transmitting the pressure from one member to another by opposing entire surfaces, transmits the pressure from one member to another through separated points, the points of application of the forces on one side of the intermediate member being offset with respect to the points of application of the forces on the other side of the intermediate member. That is to say, any given point of application on one side of the intermediate member may be said to lie between two points of application on the opposite side of the intermediate member so that any pressure received by the former would be distributed to both of the latter. This relation exists with respect to the pressures in both directions, that is the forward pressure of the pressure member and the resisting pressure of the commutator sleeve, so that a complete distribution of the pressure is obtained. As points of application of the pressure I use projections such as radial ribs which are disposed on the sides of the ring in such a way that the axes of the projections on one side are displaced with respect to the axes of the projections on the other side. Preferably I use a pair of projections or ribs on each side of the ring, the ribs of each pair being diametrically opposite each other and the axes of the pairs being displaced with respect to each other at an angle of 90°. Thus the intermediate member will be adapted to swing around two axes at right angles to each other.

Figure 2:
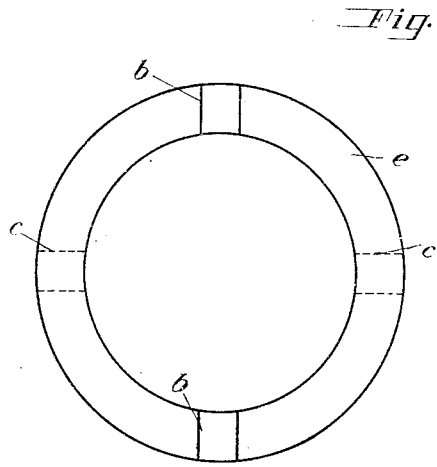

In the accompanying drawing Figure 1 shows a commutator according to my invention in a diagrammatic view and Fig. 2 shows the construction of the intermediate member or ring which is interposed between the commutator and the armature body.

In the drawing $w$ indicates the shaft of the dynamo, said shaft carrying the commutator having laminæ $k$. These laminæ are pressed against the holding ring $h$ when the externally tapered sleeve $d$ is forced forward by the turning of nut $p$ which is in threaded engagement with the shaft $w$. The pressure is exerted by the nut $p$ which fits the threaded part on the circumference of the shaft and which may be rotated against the sleeve $d$. Inserted between the nut $p$ and the pressure sleeve $d$ is the abovementioned intermediate member or ring $e$, which, as shown in the drawing, is provided with a pair of ribs $b$ and $c$ on either side, as can be seen from Fig. 2. The ribs of each pair are diametrically arranged, so that the axes of the two pairs of ribs will form an angle of 90 degrees with each other. The ring-shaped member $r$ which is further interposed between the sleeve $d$ and the ring $e$ serves solely as spacing member. The interior surface *i* of the ring which is directed toward the shaft is so rounded off that the ring may easily swing around the ribs.

Having thus described my invention I claim as new and desire to secure by Letters Patent of the United States:—

1. In a dynamo electric machine, the combination of a shaft, a commutator carried thereby, means carried by said shaft for exerting pressure against said commutator, a ring-like member interposed between said commutator and said pressure means, a pair of radial ribs interposed between the lateral faces of said commutator and said ring-like member, and a second pair of radial ribs interposed between the lateral faces of said ring-like member and said pressure means, the ribs of each of said pairs being arranged substantially opposite each other.

2. In a dynamo electric machine, the combination of a shaft, a commutator carried thereby, means carried by said shaft for exerting pressure against said commutator, a ring-like member interposed between said commutator and said pressure means, and a pair of radial ribs on each lateral face of said interposed member, the ribs of each of said pairs being arranged diametrically opposite one another and the axes of said pairs crossing one another at an angle of 90°.

3. In a dynamo electric machine, the combination of a shaft, a commutator carried thereby, means carried by said shaft for exerting pressure against said commutator, a ring-like member interposed between said commutator and said pressure means, a plurality of radial ribs interposed between the lateral faces of said commutator and said ring-like member, and a plurality of radial ribs interposed between the lateral faces of the said ring-like member and said pressure means, the ribs adjacent one lateral face of the said ring-like member being in staggered relation to the ribs adjacent the opposite lateral faces of said ring-like member.

HUGO HAAGE.

Copies of this patent may be obtained for five cents each, by addressing the "Commissioner of Patents, Washington, D. C."